(12) United States Patent
Ingerle

(10) Patent No.: US 10,752,529 B2
(45) Date of Patent: Aug. 25, 2020

(54) METHOD FOR BIOLOGICAL WASTEWATER PURIFICATION

(71) Applicant: Kurt Ingerle, Goetzens (AT)

(72) Inventor: Kurt Ingerle, Goetzens (AT)

( * ) Notice: Subject to any disclaimer, the term of this patent is extended or adjusted under 35 U.S.C. 154(b) by 0 days.

(21) Appl. No.: 15/565,751

(22) PCT Filed: Apr. 11, 2016

(86) PCT No.: PCT/AT2016/050090
§ 371 (c)(1),
(2) Date: Oct. 11, 2017

(87) PCT Pub. No.: WO2016/172749
PCT Pub. Date: Nov. 3, 2016

(65) Prior Publication Data
US 2018/0118593 A1 May 3, 2018

(30) Foreign Application Priority Data
Apr. 27, 2015 (AT) .................................. 50337/2015

(51) Int. Cl.
*C02F 3/12* (2006.01)
*C02F 3/30* (2006.01)
*C02F 101/10* (2006.01)

(52) U.S. Cl.
CPC ............ *C02F 3/121* (2013.01); *C02F 3/1247* (2013.01); *C02F 3/1263* (2013.01); *C02F 3/308* (2013.01);
(Continued)

(58) Field of Classification Search
CPC ........ C02F 3/1263; C02F 3/223; C02F 3/121; C02F 3/12; C02F 11/12; C02F 3/30; C02F 3/302; C02F 3/308
(Continued)

(56) References Cited

U.S. PATENT DOCUMENTS 5,228,996 A * 7/1993 Lansdell ............... C02F 3/1263
210/605
5,462,672 A * 10/1995 Iji ............................ C02F 1/56
210/727

(Continued)

FOREIGN PATENT DOCUMENTS

DE 102009039316 A1 3/2011
EP 0670817 B1 12/1999
EP 0851844 B1 10/2002

OTHER PUBLICATIONS

International Search Report and Written Opinion for PCT/AT2016/050090, dated Jun. 8, 2016 (10 pages).

*Primary Examiner* — Claire A Norris
(74) *Attorney, Agent, or Firm* — Eversheds Sutherland (US) LLP

(57) ABSTRACT

The invention relates to a method for carrying out biological purification of wastewater with the aid of activated sludge, in which the wastewater is introduced into a tank for phosphor elimination (P tank), then into an activated sludge tank (B tank) and then into at least one sedimentation and recirculation tank (SU tank), in which a number of operating cycles are carried out, including a sludge return phase, a recirculation phase, a pre-sedimentation phase and a draw-off phase (S phase, U phase, V phase, and A phase respectively), wherein the method further includes the elimination of settleable solids of the inflow, the storage of the produced primary and excess sludge and the reduction of the rising of the water level in the wastewater purification system by using an additional tank (S tank), wherein the S tank is hydraulically connected with the P tank, the P tank with the B tank, and the B tank with the at least one SU tank, wherein the wastewater is first introduced into the S tank, then into the P tank, then into the B tank and subsequently into the at least one SU tank, wherein in the S phase the thickened (Continued)

activated sludge is introduced from the at least one SU tank into the P tank, in the U phase the volume of the at least one SU tank is mixed, in the V phase the activated sludge is settled, and in the A phase the treated wastewater is flowing out of the system and wherein the settled sludge of the S tank is transported from time to time to another special treatment plant.

13 Claims, 2 Drawing Sheets

(52) U.S. Cl.
CPC .... *C02F 2101/105* (2013.01); *C02F 2209/08* (2013.01); *C02F 2209/44* (2013.01); *C02F 2301/046* (2013.01); *Y02A 20/216* (2018.01); *Y02W 10/15* (2015.05)

(58) Field of Classification Search
USPC .............................. 210/195.3, 605, 620, 621
See application file for complete search history.

(56) References Cited

U.S. PATENT DOCUMENTS

| | | | |
|---|---|---|---|
| 5,902,484 A * | 5/1999 | Timpany | C02F 3/006 210/621 |
| 6,802,975 B2 | 10/2004 | Ingerle | |
| 2003/0164331 A1* | 9/2003 | Ingerle | C02F 3/121 210/626 |
| 2009/0071909 A1* | 3/2009 | Newcombe | B01D 24/30 210/739 |
| 2010/0224136 A1* | 9/2010 | Papadoyianis | A01K 61/60 119/223 |
| 2010/0315069 A1* | 12/2010 | Heer | G05B 23/0256 324/207.11 |
| 2013/0020266 A1* | 1/2013 | Timmons | A01K 63/045 210/786 |
| 2014/0360934 A1* | 12/2014 | Anker | B01F 5/0212 210/620 |
| 2016/0030889 A1* | 2/2016 | Kim | C02F 1/44 210/636 |
| 2019/0216027 A1* | 7/2019 | Sternberg | A01B 45/02 |

* cited by examiner

METHOD FOR BIOLOGICAL WASTEWATER PURIFICATION

The present invention relates to a method for carrying out biological purification of communal or similar wastewater with the aid of activated sludge according to the preamble of claim 1, in which the wastewater is first introduced into a tank for biological phosphor elimination (hereinafter referred to as P tank), wherein the P tank can be mixed, then into an activated sludge tank that can be ventilated (hereinafter referred to as the B tank) and then into at least one sedimentation and recirculation tank (hereinafter referred to as SU tank), in which a number of operating cycles are carried out over the course of a day, including a sludge return phase, a recirculation phase, a pre-sedimentation phase and a draw-off phase (hereinafter referred to as the S phase, the U phase, the V phase and the A phase, respectively), wherein, consecutively, in the S phase the thickened activated sludge is returned in succession from the SU tank into the P tank, in the U phase the activated sludge is again mixed with the water, in the V phase the activated sludge is sedimented, and, in the A phase treated water is drawn off, wherein in the SU tanks the cycles are phase-shifted in relation to one another, a flow passes through the SU tank in the A phase, a rising water level in the other phases is provided and, therefore, a wastewater treatment system discharge corresponding to the wastewater treatment system supply develops ("filling up"-principle), and, wherein the P tank is hydraulically connected with the B tank, and, wherein the B tank is hydraulically connected with the at least one SU tank. Moreover, the present invention relates to devices for carrying out this method.

A method for biological purification of wastewater with the aid of activated sludge, in which the wastewater is first introduced into an activated sludge tank that can be ventilated and then into a sedimentation tank, in which activated sludge and treated water are separated and, after the separation process, activated sludge is fed back into the activated sludge tank and treated water is drawn off, is known from European patent EP 0 851 844. A number of operating cycles are carried out in the sedimentation tank over the course of a day and comprise a stirring phase U, a pre-sedimentation phase V and a draw-off phase A, wherein, in the stirring phase, the activated sludge is again mixed with the water, in the pre-sedimentation phase the activated sludge is sedimented, and in the draw-off phase treated water is drawn off. In accordance with the method according to this document, the purification process takes place in a biological twin-tank system that is to say in the activated sludge tank and in the sedimentation tank, with continuous inflow and intermittent outflow. During the period of no outflow, the water level increases as a result of the inflow ("filling-up"-principle). The patent claim of this method consists in the fact that sedimented activated sludge is returned to the activated sludge tank of the "twin-tank system with filling operation" after the pre-sedimentation phase and before the stirring phase. In the stirring phase, the contents of the B tank (activated sludge tank) are mixed with the contents of the SU tank (sedimentation tank) until a constant dry substance concentration is obtained. Both tanks border one another and are continuously interconnected hydraulically in the base region. (Three phase system: U, V, A phase).

A similar method is known from international patent PCT/AT00/00322, in which sedimented, thickened activated sludge is returned from the SU tanks into the B tank after the V phases, but before the U phases (S phase). In the S phase, thickened sludge is conveyed from the base of the SU tanks into the upper region of the B tank, and the contents of the B tank thus displaced are returned via the openings in the central region of the tank. In the U phase, the contents of the SU tank are swirled and homogenized, without generation of a circulating flow via the B tank. In the A phase, there is a flow from the B tank into the SU tank, likewise through the openings in the central region. The stirring in the SU tanks (U phase) is achieved by blowing in air. The B tank is continuously connected hydraulically to two SU tanks by one or more openings in the central region of the tank. (Four phase system: S, U, V, A phases; "throughflow"-principle).

The object of the present invention is to improve and/or complement the method described in the introduction for biological wastewater purification in such a way that an application for wastewater treatment plants is also made possible.

This object is achieved by a method having the features of claim 1 and by devices for carrying out this method. Advantageous developments of the invention are disclosed in the dependent claims.

The method according to the invention is characterized by using a tank for the sedimentation and storage of settleable solids of the inflow, by storage of excess sludge and by reducing the rising of the water level in the V phase (hereinafter referred to as S tank). The S tank is hydraulically connected with the P tank via one or more openings. The crude wastewater is first introduced into the S tank and subsequently into the P tank, wherein consecutively excess sludge is taken out and introduced into the S tank, in the S phase thickened activated sludge is introduced from the SU tank into the P tank, in the U phase the activated sludge is again mixed with the water, in the V phase the activated sludge is sedimented, and, in the A phase treated water is drawn off, wherein in the SU tanks the cycles are phase-shifted in relation to one another, a flow passes through the at least one SU tank merely in the A phase, and, therefore, a wastewater treatment system discharge corresponding to the wastewater treatment system supply develops ("filling up"-principle), and, wherein the volume of the P tank is mixed permanently or intermittently.

In order to save space and costs, the S tank is applied in the special wastewater treatment systems described in claim 1 of the present invention. The additional constructional costs for the implementation of the S tank and the costs for the transportation and treatment of the sludge outside of the treatment system are moderate compared to the costs for a screen, a sand- and grease-chamber as well as to the additional costs for the larger B tank. The elimination of the settleable solids reduces the BOD-load and an aerob sludge treatment is not necessary: 40 g BOD/PE and not 60 g BOD/PE, sludge age 10 days and not 18 days. The B tank will be approximately 50% smaller than without the S tank. The S tank produces in the same way an equalization of the concentrations of the waste water in the B tank. The method according to the invention is suited only for small wastewater treatment systems and not for large wastewater treatment systems.

It is particularly cost-effective and energy-saving if the thickened activated sludge (S phase) is returned using air lift pumps and if compressed air is likewise used to mix the contents of the at least one SU tank (U phase). The compressed air provided for ventilation of the B tank is also sufficient for this.

Different devices can be used for the draw-off of the treated wastewater. The excess sludge will be preferably received by the P tank. The excess sludge is drawn off from the base of the P tank before a mixing of the volume of the P tank begins. The activated sludge is then thickened to the greatest possible extent.

In order to obtain a cascade effect, more than one P tank, e.g. two or more P tanks, can be provided in the method according to the invention. Preferably, the volume of the P tank is approximately V/3, with V being the volume of the SU tanks.

Excellent purification with a very low energy requirement and low costs is achieved as a result of the special water level in the B tank (see FIG. 1) and in the at least one SU tank, as a result of the use of compressed air for operation of the S and U phases (simultaneous entry of oxygen) and as a result of the extensive (endogenous) denitrification.

Accordingly, the invention relates to a wastewater purification device comprising a tank for a phosphor elimination (hereinafter referred to as P tank) that can be mixed and is hydraulically connected with the B tank, an activated sludge tank that can be ventilated (hereinafter referred to as the B tank), a at least one sedimentation and recirculation tank (hereinafter referred to as SU tank) continuously connected hydraulically to the B tank and in which a number of operating cycles are carried out over the course of a day, including a sludge return phase, a recirculation phase, a pre-sedimentation phase and a draw-off phase (hereinafter referred to as the S phase, U phase, V phase, and A phase respectively), and wherein the at least one SU tank and the P tank are connected by a pipe for allowing the activated sludge to flow from the at least one SU tank into the P tank. In order to obtain a cascade effect, the wastewater purification devices preferably contain more than one P tank, e.g. two or more P tanks. Preferably, the volume of the P tank is approximately V/3, with V being the volume of the SU tank. In the P tank, means are provided to permanently or intermittently mix the waste water with the thickened activated sludge that flows from the at least one SU tank into the P tank. The wastewater purification devices of the invention are characterized in that the S tank is hydraulically connected with the P tank.

Further details of the present invention will emerge from the following drawings, which illustrate exemplary, non-limiting embodiments of the invention. In the drawings, an operating cycle (FIG. 1) and a wastewater treatment system (FIGS. 2-3) are shown:

FIG. 1 also shows a possible operating of the P tank.

Figure 1:
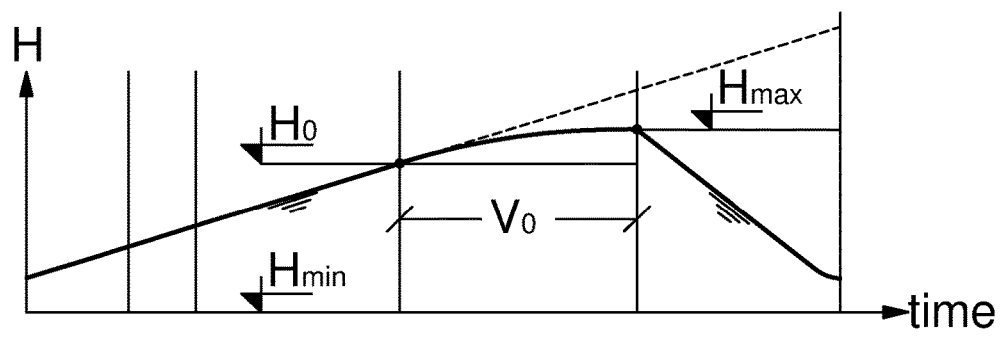
FIG. 1 shows an operating cycle for the SU tank and the associated water level in the SU tank. $H_0$ is the water level in the SU tank at the start of the overflow.

FIG. 1 shows the operating cycle for the SU tank and the associated water level in the SU tank, wherein time extends in horizontal direction from left to right. The course and function of the individual phases, i.e. S phase, U phase, V phase and A phase, have already been discussed above in greater detail. FIG. 1 also shows a possible operation of the P tank comprising three steps: mixing of the volume 11, sedimentation of the settleable solids 12 and drawing-off of the excess sludge 13.

Figure 2:
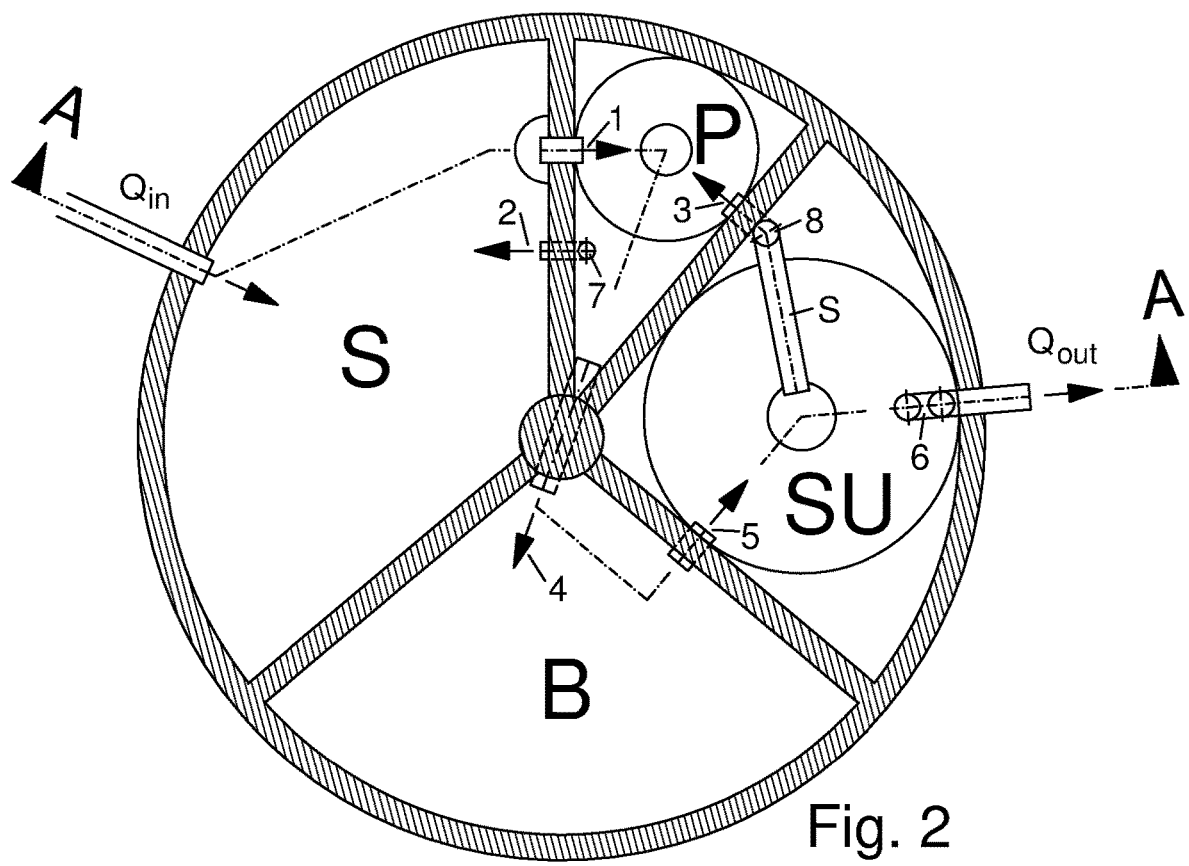
FIG. 2 shows a schematic illustration of a wastewater treatment system (ground plan).
Figure 3:
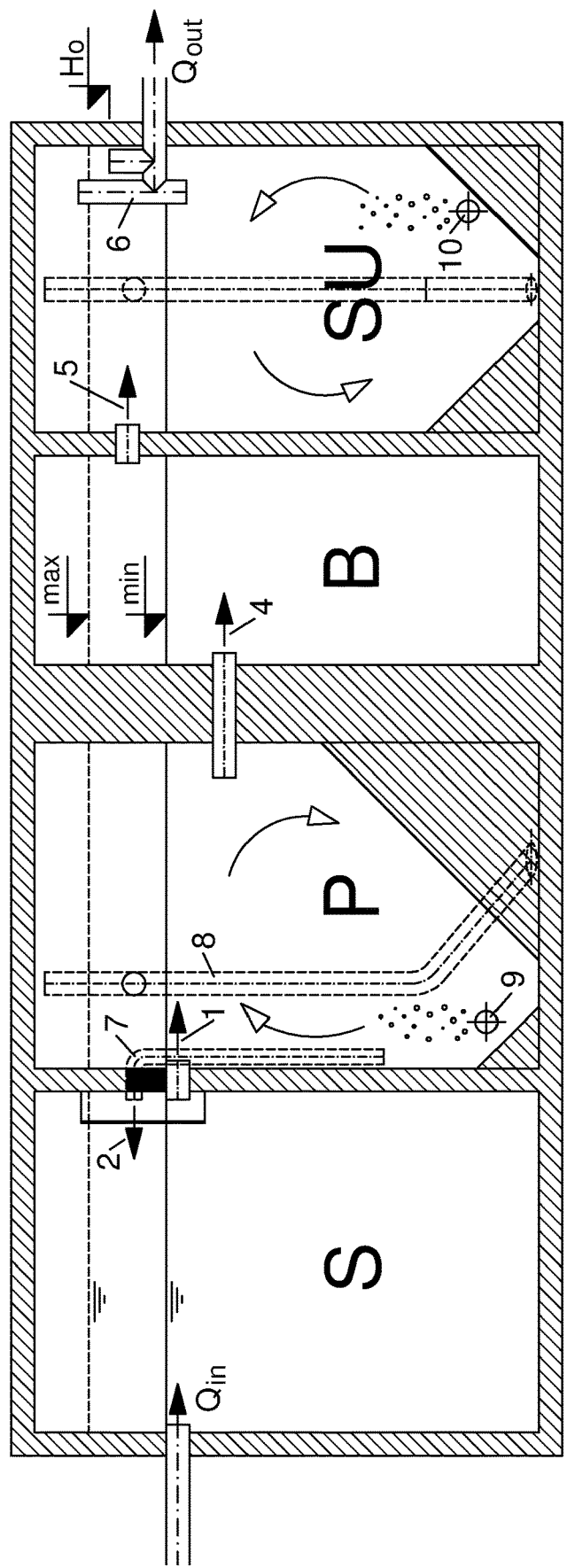
FIG. 3 shows a vertical sectional view of the wastewater treatment system of FIG. 2.

FIG. 2 shows a schematic ground plan of a wastewater treatment system, in which the following features are designated with the following reference signs:
  1 flow from the S tank to the P tank
  2 flow of the excess sludge from the P tank to the S tank
  3 flow of thickened activated sludge from the SU tank into the P tank,
  4 flow of the P tank volume to the B tank
  5 flow of the B tank volume to the SU tank
  6 outlet with an overflow and a closure with compressed air
  7 airlift for the excess sludge
  8 airlift for the thickened activated sludge FIG. 3 shows a vertical sectional view of the system of FIG. 2 (along a line which, in FIG. 2, extends between A-A). $Q_{in}$ signifies the flow of the wastewater introduced into the S tank, wherein $Q_{out}$ is the flow of the treated water flowing off the water treatment system. The thickened activated and aerated sludge flows from the SU tank into the P tank (flow 3) via an airlift 8. In order to mix the waste water in the P tank efficiently with the thickened activated sludge 9, the volume of the P tank is mixed permanently or intermittently. The mixture of waste water and sludge is then transferred into the B tank and further to the SU tank via one or more openings connecting the P tank with the B tank (flow 4) and the B tank with the SU tanks (flow 5), respectively. 8 signifies the airlift operation unit for operation of the S phase.

The volume of the P tank is approximately V/3, with V being the volume of the SU tank. The SU tank is mixed in the U phase with coarse air bubbles 10.

The invention claimed is:

1. A method for carrying out biological purification of wastewater with the aid of activated sludge in a wastewater treatment system, the method comprising:
    introducing the wastewater first into a tank for elimination of settlable solids of the inflowing wastewater, the storage of produced primary and excess sludge, and the reduction of a rising of the water level in the wastewater purification system (the S tank); and then
    introducing the wastewater into a tank for biological phosphor elimination (the P tank), wherein the volume of the P tank is mixed permanently or intermittently; and then
    introducing the wastewater into an activated sludge tank that is ventilated (the B tank) and then into a sedimentation and recirculation tank (the SU tank), in which at least one operating cycle is carried out over the course of a day, the operating cycles including a sludge return phase (the S phase), a recirculation phase (the U phase), a pre-sedimentation phase (the V phase), and a draw-off phase (the A phase), wherein the P tank is hydraulically connected with the B tank, and, wherein the B tank is hydraulically connected with the SU tank, wherein the S tank is hydraulically connected with the P tank via one or more openings;
    wherein consecutively, in the S phase a thickened activated sludge is introduced from the at least one SU tank into the P tank, in the U phase the volume of the SU tank is mixed, in the V phase the activated sludge is settled, and in the A phase treated water is drawn off, a flow of treated wastewater passes through the at least one SU tank only in the A phase, a rising water level in the phases S, U and V is provided and, therefore, a wastewater treatment system discharge corresponding to the wastewater treatment system supply develops ("filling up"-principle), and, wherein the at least one SU tank is not in an aerobic condition, wherein excess sludge present in the P tank is transferred from the P tank to the S tank.

2. The method according to claim 1, wherein the activated sludge is pumped from the at least one SU tank into the P tank via a pipe connecting the at least one SU tank with the P tank.

3. The method according to claim 1, wherein the volume of the P tank is approximately V/3, with V being the volume of the SU tank.

4. The method according to claim 1, wherein the dimension of the tanks is selected based on the quantity and quality of the wastewater and on the evacuation of the stored sludge.

5. The method according to claim 1, wherein the excess sludge is taken out of the P tank by means of an airlift at a position being approximately at one third of the height of the wastewater relative to the bottom of the P tank.

6. The method according to claim 1, wherein the thickened activated sludge is pumped from the at least one SU tank into the P tank by means of an airlift.

7. The method according to claim 1, wherein the S, P, B, and SU tanks do not form a connected round or angled unity, but different hydraulically connected single tanks.

8. The method according to claim 1, wherein the mixing of the P tank and the at least one SU tank is performed with coarse air bubbles.

9. The method according to claim 1, wherein a sludge stored in the S tank is taken out therefrom and transported by means of a vacuum-operated tank car.

10. The method according to claim 1, wherein computer-controlled magnet vents are used to vent the B tank in the operation of the wastewater treatment system.

11. The method according to claim 1, wherein in the A phase an outlet for treated wastewater of the wastewater treatment system is closed in order to prevent the sludge from leaving the system.

12. The method according to claim 11, wherein the outlet does not comprise an electric closure, but comprises a closure with compressed air.

13. The method according to claim 1, wherein more than one SU tank is used, and the cycles carried out in the SU tanks are phase-shifted in relation to one another.

* * * * *